United States Patent
MacGregor et al.

(10) Patent No.: US 7,082,890 B2
(45) Date of Patent: Aug. 1, 2006

(54) GAUGE POINTER WITH INTEGRATED SHAPE MEMORY ALLOY ACTUATOR

(75) Inventors: Roderick MacGregor, Antioch, CA (US); Andrei Szilagyi, Danville, CA (US)

(73) Assignee: Alfmeier Prazision AG Baugruppen und Systemlosungen, Treuchtlingen (DE)

( * ) Notice: Subject to any disclaimer, the term of this patent is extended or adjusted under 35 U.S.C. 154(b) by 0 days.

(21) Appl. No.: 10/838,644

(22) Filed: May 3, 2004

(65) Prior Publication Data

US 2004/0261688 A1 Dec. 30, 2004

Related U.S. Application Data

(60) Provisional application No. 60/467,807, filed on May 2, 2003.

(51) Int. Cl.
G08B 5/24 (2006.01)
G01P 1/08 (2006.01)

(52) U.S. Cl. .................. 116/284; 116/303; 116/221; 340/815.78; 340/815.86

(58) Field of Classification Search .............. 116/284, 116/285, 290, 291, 292, 299, 221, 303; 60/527, 60/528; 74/25, 89.18; 340/815.78, 815.86; 702/94, 95, 150–154; 374/187, 204, 205
See application file for complete search history.

(56) References Cited

U.S. PATENT DOCUMENTS

| | | | |
|---|---|---|---|
| 240,059 A * | 4/1881 | Wales | 374/204 |
| 348,841 A | 7/1886 | Hainley | |
| 1,148,986 A * | 8/1915 | Prinz | 340/485 |
| 1,288,060 A | 12/1918 | Le Duc | |
| 1,658,669 A | 2/1928 | Cohn et al. | |
| 2,518,941 A | 8/1950 | Satchwell et al. | |
| 2,975,307 A | 3/1961 | Schroeder et al. | |
| 3,280,550 A * | 10/1966 | Cassidy | 60/528 |
| 3,452,175 A | 6/1969 | Wilkes | |
| 3,452,309 A | 6/1969 | Wilkes | |
| 3,634,803 A | 1/1972 | Willson et al. | |
| 3,641,296 A | 2/1972 | Schwarz | |
| 3,725,835 A | 4/1973 | Hopkins et al. | |
| 3,748,197 A | 7/1973 | Willson et al. | |
| 3,797,450 A | 3/1974 | Frisbee | |
| 3,940,935 A | 3/1976 | Richardson et al. | |
| 3,946,669 A | 3/1976 | Johue et al. | |
| 4,027,953 A | 6/1977 | Jacob | |
| 4,150,544 A | 4/1979 | Pachter | |
| 4,319,659 A | 3/1982 | Heckelman et al. | |
| 4,427,216 A | 1/1984 | Kato et al. | |

(Continued)

FOREIGN PATENT DOCUMENTS

DE 4209815 9/1993

(Continued)

OTHER PUBLICATIONS

Int'l Search Report and Written Opinion for PCT/US04/13730.

(Continued)

*Primary Examiner*—R. Alexander Smith
(74) *Attorney, Agent, or Firm*—Dority & Manning, P.A.

(57) ABSTRACT

An actuated gauge pointer that includes a shape memory alloy element configured to move the gauge pointer when activated is provided. The actuated gauge pointer includes a first shape memory alloy element disposed within the perimeter of the gauge pointer housing. Additionally, the actuated gauge pointer may include a second shape memory alloy element to provide temperature compensation, and a bias member to return the gauge pointer to an initial condition.

30 Claims, 10 Drawing Sheets

U.S. PATENT DOCUMENTS

| | | | | |
|---|---|---|---|---|
| 4,472,939 A * | | 9/1984 | Wang | 60/527 |
| 4,559,512 A | | 12/1985 | Yaeger et al. | |
| 4,579,006 A | | 4/1986 | Hosoda et al. | |
| 4,586,335 A | | 5/1986 | Hosoda et al. | |
| 4,626,085 A | | 12/1986 | Suzuki | |
| 4,652,781 A | | 3/1987 | Andrei-Alexandru et al. | |
| 4,742,680 A | | 5/1988 | Mecca | |
| 4,751,821 A | | 6/1988 | Birchard | |
| 4,761,955 A * | | 8/1988 | Bloch | 60/528 |
| 4,806,815 A | | 2/1989 | Honma | |
| 4,811,564 A | | 3/1989 | Palmer | |
| 4,829,767 A | | 5/1989 | Mecca | |
| 4,841,730 A | | 6/1989 | McDonald | |
| 4,884,557 A | | 12/1989 | Takehana et al. | |
| 4,887,430 A * | | 12/1989 | Kroll et al. | 60/527 |
| 4,914,908 A * | | 4/1990 | Sugiyama et al. | 60/527 |
| 4,932,210 A * | | 6/1990 | Julien et al. | 60/527 |
| 4,977,886 A | | 12/1990 | Takehana et al. | |
| 5,014,520 A | | 5/1991 | Orner et al. | |
| 5,054,522 A | | 10/1991 | Kowanz et al. | |
| 5,092,781 A | | 3/1992 | Casciotti et al. | |
| 5,127,228 A | | 7/1992 | Swenson | |
| 5,129,753 A | | 7/1992 | Wesley et al. | |
| 5,165,897 A | | 11/1992 | Johnson | |
| 5,166,832 A | | 11/1992 | Zychowicz | |
| 5,172,551 A | | 12/1992 | Nakajima et al. | |
| 5,182,910 A | | 2/1993 | Benecke | |
| 5,235,225 A | | 8/1993 | Colgate et al. | |
| 5,279,123 A * | | 1/1994 | Wechsler et al. | 60/527 |
| 5,306,979 A | | 4/1994 | Schwarz, Jr. | |
| 5,312,152 A | | 5/1994 | Woebkenberg, Jr. et al. | |
| 5,329,873 A | | 7/1994 | Tiballi | |
| 5,344,506 A | | 9/1994 | DeAngelis | |
| 5,353,735 A * | | 10/1994 | Arai et al. | 116/286 |
| 5,396,769 A * | | 3/1995 | Brudnicki | 60/528 |
| 5,417,487 A * | | 5/1995 | Dahnert | 312/201 |
| 5,499,702 A | | 3/1996 | Wang | |
| 5,556,370 A | | 9/1996 | Maynard | |
| 5,563,466 A | | 10/1996 | Rennex et al. | |
| 5,578,053 A | | 11/1996 | Yoon | |
| 5,618,066 A | | 4/1997 | Fu-Hsiang | |
| 5,624,012 A | | 4/1997 | Wang | |
| 5,629,662 A | | 5/1997 | Floyd et al. | |
| 5,685,148 A * | | 11/1997 | Robert | 60/527 |
| 5,694,663 A | | 12/1997 | Tserng | |
| 5,713,870 A | | 2/1998 | Yoon | |
| 5,747,993 A | | 5/1998 | Jacobsen et al. | |
| 5,763,979 A | | 6/1998 | Mukherjee et al. | |
| 5,770,913 A | | 6/1998 | Mizzi | |
| 5,771,742 A | | 6/1998 | Bokaie et al. | |
| 5,779,386 A | | 7/1998 | Eichhorn | |
| 5,829,253 A | | 11/1998 | Long et al. | |
| 5,847,475 A * | | 12/1998 | Rauch et al. | 310/49 R |
| 5,865,418 A | | 2/1999 | Nakayama et al. | |
| 5,901,554 A | | 5/1999 | Greschik | |
| 5,917,260 A | | 6/1999 | Garcia et al. | |
| 5,933,002 A * | | 8/1999 | Jacobsen et al. | 324/99 R |
| 5,990,777 A | | 11/1999 | Whiteman, Jr. | |
| 6,008,992 A | | 12/1999 | Kawakami | |
| 6,019,113 A | | 2/2000 | Allston et al. | |
| 6,069,420 A | | 5/2000 | Mizzi et al. | |
| 6,073,469 A | | 6/2000 | Julien | |
| 6,102,917 A | | 8/2000 | Maitland et al. | |
| 6,102,933 A | | 8/2000 | Lee et al. | |
| 6,126,115 A | | 10/2000 | Carrier et al. | |
| 6,133,816 A | | 10/2000 | Barnes et al. | |
| 6,145,369 A * | | 11/2000 | Corbin et al. | 73/1.88 |
| 6,164,784 A | | 12/2000 | Butera et al. | |
| 6,218,762 B1 | | 4/2001 | Hill et al. | |
| 6,255,934 B1 | | 7/2001 | Gadini et al. | |
| 6,326,707 B1 | | 12/2001 | Gummin et al. | |
| 6,327,855 B1 | | 12/2001 | Hill et al. | |
| 6,333,583 B1 | | 12/2001 | Mahadevan et al. | |
| 6,363,183 B1 | | 3/2002 | Koh | |
| 6,364,496 B1 | | 4/2002 | Boddy et al. | |
| 6,371,030 B1 | | 4/2002 | Gilman et al. | |
| 6,374,608 B1 | | 4/2002 | Corris et al. | |
| 6,404,098 B1 | | 6/2002 | Kayama et al. | |
| 6,425,343 B1 * | | 7/2002 | Akers et al. | 116/216 |
| 6,434,333 B1 | | 8/2002 | Tanaka et al. | |
| 6,441,746 B1 | | 8/2002 | Taborisskiy et al. | |
| 6,450,064 B1 | | 9/2002 | Christiansen et al. | |
| 6,508,437 B1 | | 1/2003 | Davis et al. | |
| 6,516,146 B1 | | 2/2003 | Kosaka | |
| 6,527,310 B1 | | 3/2003 | Bellamy | |
| 6,530,718 B1 | | 3/2003 | Nygren et al. | |
| 6,542,133 B1 * | | 4/2003 | Kelman et al. | 345/7 |
| 6,574,958 B1 | | 6/2003 | MacGregor | |
| 6,741,184 B1 * | | 5/2004 | Miller et al. | 340/815.78 |
| 6,851,260 B1 * | | 2/2005 | Mernøe | 60/527 |
| 2002/0113499 A1 | | 8/2002 | Von Behrens et al. | |
| 2003/0106761 A1 | | 6/2003 | Taylor | |
| 2004/0035108 A1 | | 2/2004 | Von Behrens et al. | |
| 2004/0035687 A1 | | 2/2004 | Szilagyi | |
| 2004/0112049 A1 | | 6/2004 | Von Behrens et al. | |
| 2005/0000574 A1 | | 1/2005 | McGregor et al. | |

FOREIGN PATENT DOCUMENTS

| | | |
|---|---|---|
| DE | 19509177 | 9/1996 |
| EP | 0147491 | 7/1985 |
| FR | 7709117 | 10/1978 |
| FR | 2730766 | 8/1996 |
| GB | 2068545 | 8/1981 |
| GB | 2093589 | 9/1982 |
| GB | 2334046 | 8/1999 |
| JP | 62175628 A * | 8/1987 |
| JP | 62771970 A * | 11/1987 |
| JP | 07198502 A * | 8/1995 |
| JP | 07274561 | 10/1995 |
| JP | 09127398 A * | 5/1997 |
| KR | 9605617 | 4/1996 |
| KR | 9607599 | 6/1996 |
| WO | WO 9808355 | 2/1998 |
| WO | WO 0112985 | 2/2001 |

OTHER PUBLICATIONS

Aircraft Maneuverability, http://www.cs.ualberta.ca/~database/MEMS/sma_mems/flap.html, printed Apr. 17, 2003, pp. 1-2.

Bokaie, Latch-Release Pin Puller with Shape Memory Alloy Actuator, Lewis Research Center, http://www.nasatech.com/Briefs/Feb98/LEW16511.html.

Bone Plates, http://www.cs.ualberta.ca/~database/MEMS/sma_mems/bone.html, printed Apr. 17, 2003 pp. 1-2.

Glossary: Pseudo-elasticity (or super-elasticity), http://www.cs.ualberta.ca/~database/MEMS/sma_mems/glossary.cgi, printed Apr. 17, 2003.

Glossary: Shape Memory Effect, http://www.cs.ualberta.ca/~database/MEMS/sma_mems/glossary,cgi, printed Apr. 17, 2003.

Grant, et al., "Variable Structure Control of Shape Memory Alloy Actuators", IEEE Control Systems 17(3):80-88.

Hashimoto, et al., "Application of Shape Memory Alloy to Robotic Actuators", J. Robotic Systems 2(1): 3-25.

Hirose, et al:, "A new design of servo-actuators based on the shape memory effect", Theory and Practice of Robots and Manipulators, 339-349.

Hodgson, et al., Shape Memory Alloys, http://www.sma-inc.com/SMAPaper.html, printed Apr. 17, 2003, pp. 1-12.

Ikuta, et al., "Mathematical model and experimental verification . . . ", IEEE Robotics and Automation 4:103-108.

Ikuta, et al., "Shape Memory Alloy Servo Actuator System with Electric Resistance Feedback and Application for Active Endoscope", Proc. IEEE Int. Conf. on Robotics and Information 427-430.

Ikuta, "Micro/Miniature Shape Memory Alloy Actuator", IEEE Robotics and Automation 3:2156-2161.

Kuribayashi "A New Actuator of a Joint Mechanism Using TiNi Alloy Wire", Int. J. Robotics 4(4):47-58.

Mills JW, "Lukasiewicz" Insect: The Role of Continuous-Valued Logic in a Mobile Robot's Sensors, Control and Locomotion, in Siquito: Advanced Experiments with a Simple and Inexpensive Robot Chapter 12, pp. 197-211, IEEE Computer Society Press, Los Alamitos, CA USA ISBN 0-8186-7408-3.

Otsuka, et al., "Shape Memory Materials", pp. 36-48, Cambridge University Press, Cambridge, England ISBN 0-521-44487X.

Rediniotis, et al., Development of a Shape-Memory Alloy Actuated Biometric Hydrofoil, Journal of Intelligent Material Systems and Structures, 13:35-49.

Robotic Muscles, http://www.cs.ualberta.ca/~database/MEMS/sma_mems/muscle.html., printed Apr. 17, 2003, pp. 1-4.

Shape Memory Alloys, http://www.cs.ualberta.ca/~database/MEMS/sma_mems/sma.html., printed Apr. 17, 2003, pp. 1-4.

Smith, et al., Development of Shape Memory Alloy (SMA) Actuated Mechanisms for Spacecraft Release Applications, SSC99-XI-7, 13th AIAA/USC Conference on Small Satellites.

Technical Characteristics of FLEXINOL™ Actuator Wires, Dynalloy, Inc., Printed on Feb. 16, 2001.

WPI Database XP002202662, "Shape memory metal actuator control device — has minimum and maximum detector to monitor state of actuator based on its minimum and maximum allowable impedance".

* cited by examiner

GAUGE POINTER WITH INTEGRATED SHAPE MEMORY ALLOY ACTUATOR

CROSS REFERENCE TO RELATED APPLICATIONS

This application claims benefit under 35 U.S.C. 119(e) of U.S. Provisional Patent Ser. No. 60/467,807, filed May 2, 2003 entitled "Gauge Pointer with Integrated Shape Memory Actuator," which is incorporated herein by reference in its entirety.

FIELD OF THE INVENTION

The present invention relates generally to the field of instruments and gauges, as well as rotary actuators generally, and more particularly to shape memory alloy actuators used as driving mechanisms for gauge indicators such as pointers.

BACKGROUND OF THE INVENTION

Instrument panels, or clusters, are commonly found in a variety of vehicles and in industrial equipment. Often the instruments in those panels provide information about the condition or behavior of a system and its components, where the information is typically derived from remotely located sensors. One such instrument is an analog gauge composed of a gauge pointer that moves relative to some indicative scale. An example of such a scale is the fuel gauge; label "E" indicates empty, and various other labels indicate other states of fuel levels, such as "¼," "½," "¾," as well as "F" for full. Conventional gauge pointers generally use a rotational motor to position the pointer to reflect a condition of the system being indicated. The rotational motors of present-day art consist mainly of air-core motors and stepper motors. Although these motors are commonplace, their form-factor and weight represent obstacles in progressing toward lighter, thinner, and better illuminated gauges. Such attributes are particularly desirable for automotive applications where weight and thickness savings have cost and environmental benefits, and where improved indicator visibility may result in increased passenger safety.

The thermoelastic properties of shape memory alloys (SMA) have been known since the 1930s, but commercially viable uses for SMAs were not widespread until the 1990s. Today, SMAs are finding unique applications in a variety of industries. One such application is an SMA-actuated gauge pointer, which is described in U.S. Pat. No. 6,441,746 to Taborisskiy et al. But the pointer mechanism proposed by Taborisskiy requires a cumbersome gearing mechanism within a large footprint, much like previously known stepper motor-actuated pointers. Further, Taborisskiy's proposed gauge mechanism lacks thermal compensation for the SMA element and thus is generally sensitive to environmental temperature swings. Without a compensation mechanism, Taborisskiy's gauge mechanism is generally prone to conveying unreliable measurements.

In view of the foregoing, what is needed is an improved rotary actuator, and more specifically, an improved SMA-actuated gauge pointer to overcome these and other shortcomings in existing instrument devices, such as gauge pointer actuators.

SUMMARY OF THE INVENTION

The present invention provides a rotary actuator and a method for generating rotational movement using a shape memory alloy ("SMA") rotary actuator. Although various exemplary SMA rotary actuators are disclosed, they are generally described in an illustrative application—actuating gauge pointers. But the SMA rotary actuators of the present invention are not limited to actuate gauge pointers; they may be implemented in any suitable application requiring generation of rotational movement. At least one embodiment of the present invention provides a shape memory alloy actuated indicator. The indicator has a housing, as well as a shape memory alloy element disposed within the perimeter of the indicator housing. Activation of the shape memory alloy element causes movement of indicator housing.

In another embodiment, an exemplary gauge pointer includes a gauge pointer housing that is shape memory alloy-actuated. The pointer includes a first and second shape memory alloy element disposed within the perimeter (or an area or region no larger than that perimeter) of the gauge pointer housing configured such that activation of the first shape memory alloy element causes movement of the gauge pointer housing in a first direction, and activation of the second shape memory alloy element causes movement of the gauge pointer housing in a second direction.

In a specific embodiment, a control system manages the position of a gauge indicator. The system includes a gauge indicator having a perimeter, a shape memory alloy element disposed entirely within the gauge indicator perimeter and configured so that shape memory element activation results in gauge indicator movement. The system also includes a position sensor that indicates the position information of the gauge indicator after shape memory alloy actuation and a condition responsive control device, such as a computing device (e.g., a microcontroller), adapted to control the activation of the shape memory alloy element in response to the position information provided by the position sensor and an external signal representing a monitored condition.

BRIEF DESCRIPTION OF THE DRAWINGS

The invention is more fully appreciated in connection with the following detailed description taken in conjunction with the accompanying drawings, in which.

Like reference numerals refer to corresponding parts throughout the several views of the drawings.

DETAILED DESCRIPTION OF EXEMPLARY EMBODIMENTS

Figure 1A:
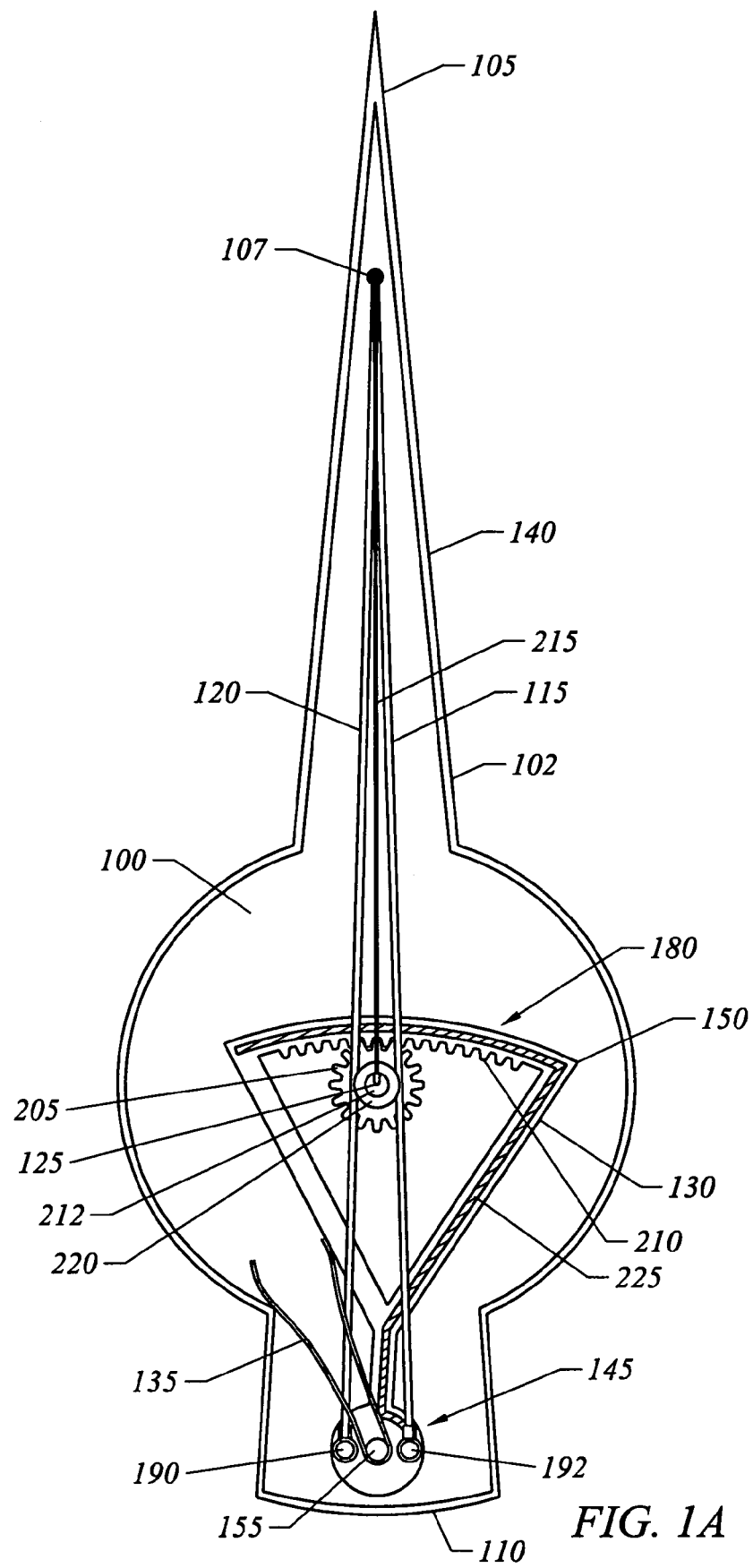
FIG. 1A is a top-down view of an integrated SMA-actuated gauge pointer of an embodiment of the present invention.

FIG. 1A illustrates a top-down view of an exemplary SMA-actuated gauge pointer 100, according to an embodiment of the present invention. Gauge pointer 100 includes a gauge pointer housing 102 having a perimeter 140, a distal end 105 and a proximate end 110. Arranged within the perimeter 140 are a first SMA element 115, a second SMA element 120, a pin 125, a lever 130, and a bias member 135. An SMA 'element' refers to an SMA material of elongate form, capable of contraction and elongation along the longitudinal axis. The element may have a circular cross-section, as is the case for a wire, or any of a variety of cross-sections such as elliptical, square, rectangular, or the like. Shape memory alloy (SMA) refers to metals, which exhibit two very unique properties: pseudo-elasticity and the shape memory effect. Pseudo-elasticity refers to the almost rubber-like flexibility of SMAs. The shape memory effect refers to the unique ability of shape memory alloys to be deformed and then returned to their original shape simply by heating them. By way of example and not limitation, shape memory alloys include NiTi (Nickel-Titanium), CuZnAl, and CuAlNi among others.

In a representative embodiment, pin 125 is fixed to an instrument panel with gauge pointer housing 102 operably coupled so that gauge pointer housing 102 may move (i.e., rotate) relative to pin 125. Pin 125 is configured to provide electrical power and a ground return connection to first SMA element 115, as is discussed below with respect to FIG. 2.

Figure 1B:
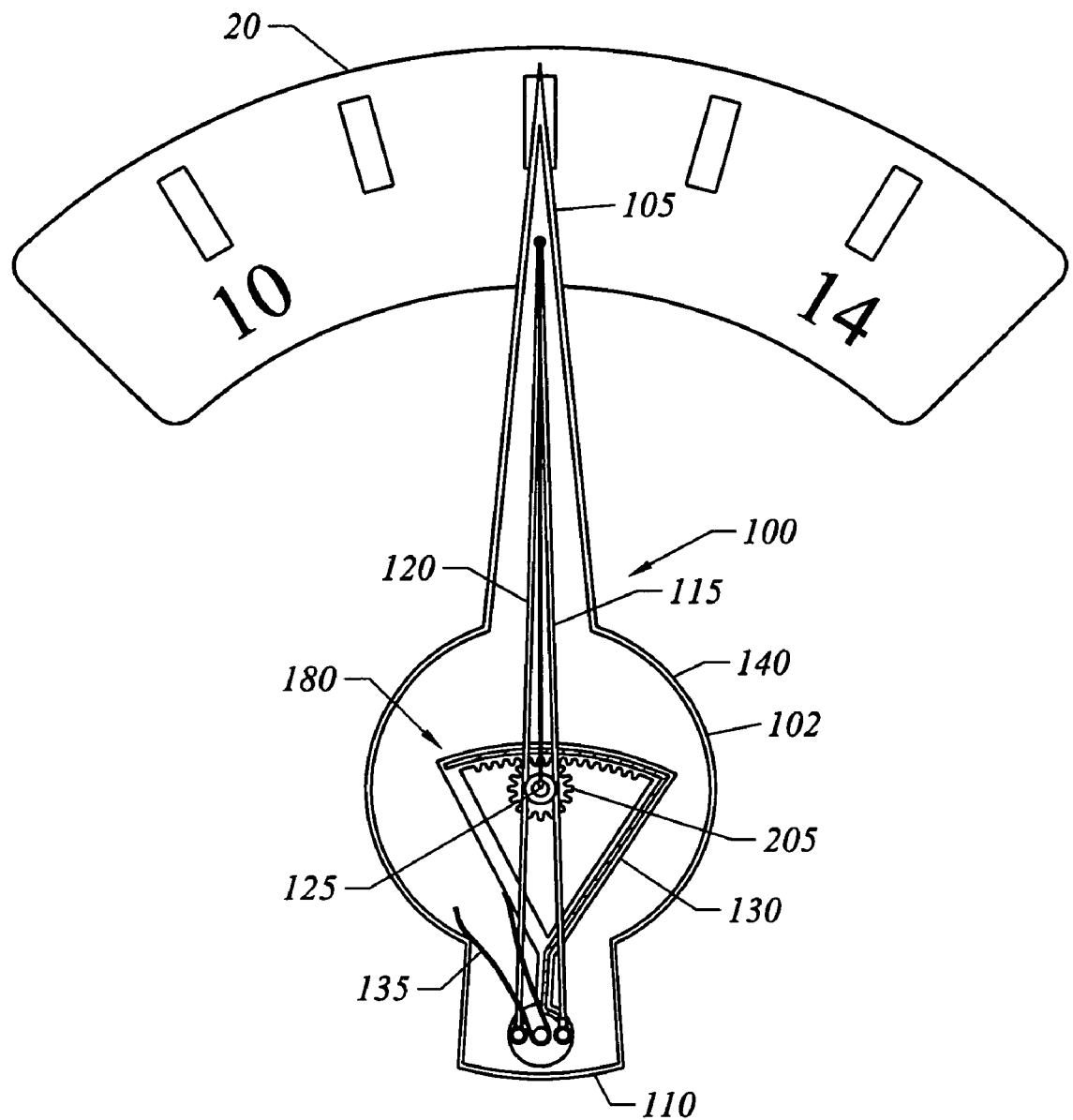
FIG. 1B is illustrates an application using the integrated SMA-actuated gauge pointer of FIG. 1A.

FIG. 1B illustrates an exemplary application of an SMA-actuated instrument device in accordance with at least one embodiment of the present invention. In this example, a gauge pointer is mounted relative to an instrument gauge (e.g., a voltage scale) to form part of an instrument array, such as in the dashboard of a vehicle. Here, instrument gauge 20 is a battery gauge indicating voltages scaled from 10 to 14 volts. As is discussed below, SMA-actuated movement of a yoke 130 causes arcuate movement of the needle (i.e., gauge pointer housing 102) relative to instrument gauge 20. Typically, the SMA-actuated movement is in response to measurements taken by a conventional control and/or monitoring system that measures battery voltage. One such monitoring system is a remotely-located voltage sensor. In some embodiments, an SMA feedback control system activates gauge pointer 100 to move distal end 105 (as well as the SMA elements residing within perimeter 140) to indicate a measured state of the battery.

Referring back to FIG. 1A, yoke 130 includes a base end 145 and an arcuate portion 150. Yoke base end 145 is coupled to proximate end 110. Yoke 130 operates as a lever to amplify rotational motion about proximate end 110, the rotational motion being generated by activation of an SMA element. Structurally, yoke 130 can be fabricated from fiberglass reinforced board, such as FR4 (commonly used for printed circuit boards) or any of a number of sufficiently rigid, moldable plastics. Or, yoke 130 can be formed using any other rigid, light-weight material. In one embodiment, yoke 130 is rotatably coupled to gauge pointer housing 102 through a yoke pivot 155. Arcuate portion 150 is operably coupled to pin 125 via an epicyclic gear mechanism 180. Although in most embodiments pin 125 generally is a cylindrically-shaped structural member, such as a commercial spring pin, an ordinarily skilled artisan should appreciate that other structural coupling members and methods of connection can be readily understood and are available to those skilled in the art. That is, so long as such structural coupling members are capable of at least supporting gauge pointer 100. In some embodiments, pin 125 provides electrical conduits through which to provide power and a ground return to an SMA actuator. Further, bias member 135 is disposed between yoke 130 and gauge pointer housing 102 and is configured to store return force during SMA activation and then release that stored return force when the SMA element is de-activated. Although bias member 135 is shown to be a spring clip, any other known equivalent force-storing mechanisms are suitable for substitution.

First SMA element 115 has a first end connected to distal end 105 at attachment point 107, and has a second end connected to connection point 192 at yoke base end 145, which is adjacent to yoke pivot 155. Similarly, second SMA element 120 has a first end connected to distal end 105 at attachment point 107, and has a second end connected to connection point 190 at yoke base end 145, whereby second SMA element 120 is in an antagonistic configuration to first SMA element 115. First SMA element 115 and second SMA element 120 can be connected to yoke 130 by any suitable means, such as for example, soldering, crimping or the like. Second SMA element 120 can be configured as an unpowered SMA element similar in size, shape and gauge (i.e., cross-sectional area) to first SMA element 115. As such, second SMA element 120 provides temperature compensation for the operation of first SMA element 115. So, with the unpowered second SMA element 120 placed in an antagonistic arrangement with respect to the powered first SMA element 115, second SMA element 120 provides temperature compensation for increases in ambient temperatures around the SMA elements that otherwise may cause those elements to contract unwittingly. Because second SMA element 120 is configured in an antagonistic relationship with first SMA element 115, any contraction by SMA element 115 due to increased ambient temperatures is cancelled out by a corresponding temperature-induced contraction of second SMA element 120.

In at least one embodiment, exemplary epicyclic gear mechanism 180 includes a planet gear 205 rigidly connected to pin 125. Epicyclic gear mechanism 180 further includes a ring gear 210 coupled to arcuate portion 150 and is so configured to engage planet gear 205. Planet gear 205 can be coupled to pin 125 using any conventional fastening method. Alternatively, planet gear 205 can be integrally formed as part of pin 125. Similarly, ring gear 210 may be attached to arcuate portion 150 using any conventional fastening method. Or, ring gear 210 can be integrally formed as part of yoke 130. Epicyclic gear mechanism 180 allows for a compact, low-profile SMA-actuated gauge pointer that offers several advantages. One advantage is that the epicyclic gear mechanism 180 is a compact device providing two-stage amplification of the rotation of gauge pointer 100 relative to pin 125. In a first amplification, the stroke of first SMA element 115 is amplified by the coupling through yoke 130 as a lever to ring gear 210. In a second amplification, the rotation of gauge pointer 100 is amplified by the relatively small gear ratio between planet gear 205 and ring gear 210. The remaining labeled elements of FIG. 1A are described next in relation to FIG. 2.

Figure 2:
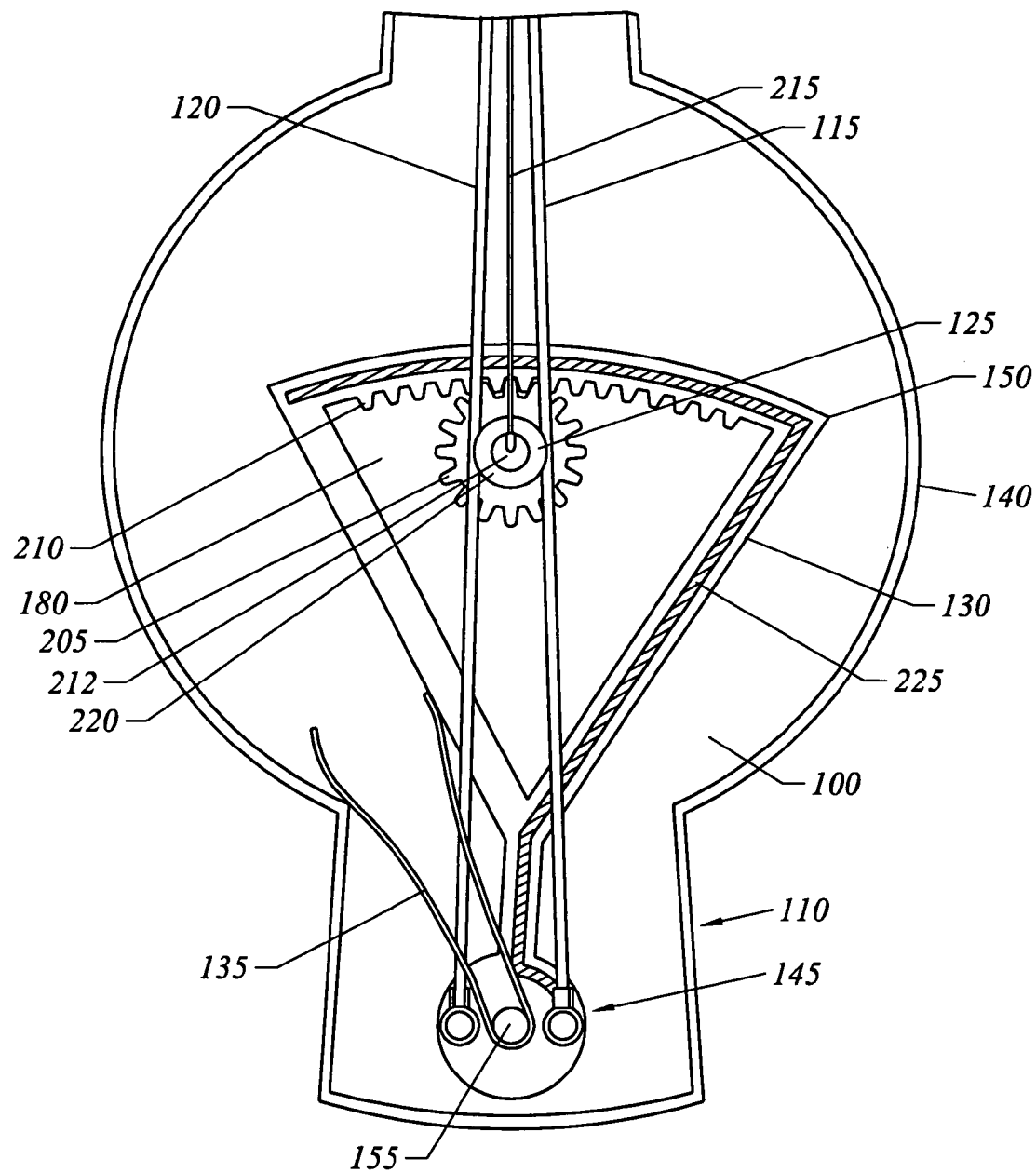
FIG. 2 is an enlarged top-down view of a portion of the SMA-actuated gauge pointer in FIG. 1A, according to an embodiment of the present invention.

FIG. 2 illustrates one example of how to provide electrical power to first SMA element 115 as well as how to harness the mechanical power generated therefrom, according to one embodiment of the present invention. FIG. 2 shows a top-down view of a portion of gauge pointer 100 illustrating an epicyclic gear mechanism 180 coupling yoke 130 and pin 125 and connections for delivering power to first SMA element 115. As for the latter, pin 125 is configured to provide electrical power and operate as a ground return via respective inner connection 212 and outer connection 220, both of which are electrically isolated from each other. Ground return 215 is connected at inner connection 212 and extends to attachment point 107 at distal end 105. A power source (not shown) is connected to outer connection 220, which is also electrically connected to planet gear 205. Any one of a number of methods for forming electrical connections may be employed to electrically connect couple planet gear 205 to conductive path 225. For instance, a relatively thin, resilient conductive disk (not shown), or a like member, (not shown) can be rigidly joined to planet gear 205 (i.e., the disk can be concentrically mounted on the top of pin 125) so that the outer perimeter of the disk overhangs conductive trace 225. Moreover, the disk can include a contact member (e.g., a wiper contact) to form an electrical path between the disk and conductive trace 225. In this arrangement, the resilient nature of the disk keeps its contact touching conductive trace 225 as the trace sweeps across the contact as arcuate portion 150 moves under the disk. Needless to say, the top-most surface of the contact disk is electrically insulated (e.g., coated with an insulating material) to prevent unintentional direct contact to nearby SMA elements 115 and 120. Thus, epicyclic gear mechanism 180 and pin 125 at least advantageously provide a compact means of supplying power to the first SMA element 115. This design obviates the need for separate electrical power components and connections within gauge pointer 100.

In operation, electric current is provided to first SMA element 115 through electrical path 225 described above. The amount of current provided to effectuate SMA actuation is determined by the amount of desired gauge deflection indicated by a remote system (see e.g., FIG. 8). Electric current causes a contraction, or activation, of first SMA element 115. As used herein, the term 'contraction' or 'activation' refers to application of sufficient energy to an SMA element for that element to undergo at least a partial martensite to austenite phase change. Activation of first SMA element 115 causes ring gear 210 to roll (e.g., enmesh) clockwise around planet gear 205, which results in clockwise rotation of gauge pointer 100 about pin 125. If pin 125 is mounted on a fixed housing, such as a dashboard (not shown), gauge pointer 100 can then rotate to a specified position relative to the fixed housing so as to indicate the remote condition of the sensor of interest, such as the battery sensor mentioned in connection with FIG. 1B.

When yoke 130 is deflected by contraction of first SMA element 115, bias member 135 is placed under a load. As yoke 130 is deflected, bias member 135 is compressed, which generates and stores a return energy. But once an amount of electric current is removed from first SMA element 115, the stored return energy in bias member 135 is released, thereby returning yoke 130 to its initial position and elongating first SMA element 115. This chain of events also rotates gauge pointer 100 to its initial condition prior to the activation of first SMA element 115.

According to an embodiment of the present invention, gauge pointer 100 returns to an initial condition whenever power to first SMA element 115 is terminated or disrupted. It is contemplated that this initial condition represents a zero-indicating condition for the system being monitored and indicated by the gauge. However, it is to be appreciated that alternate embodiments of the present invention may involve non zero-indicating conditions, such as a power-off or power-disrupted condition, or any of a variety of other conditions. Such an alternative embodiment-is discussed below in connection with FIG. 4A.

Figure 3:
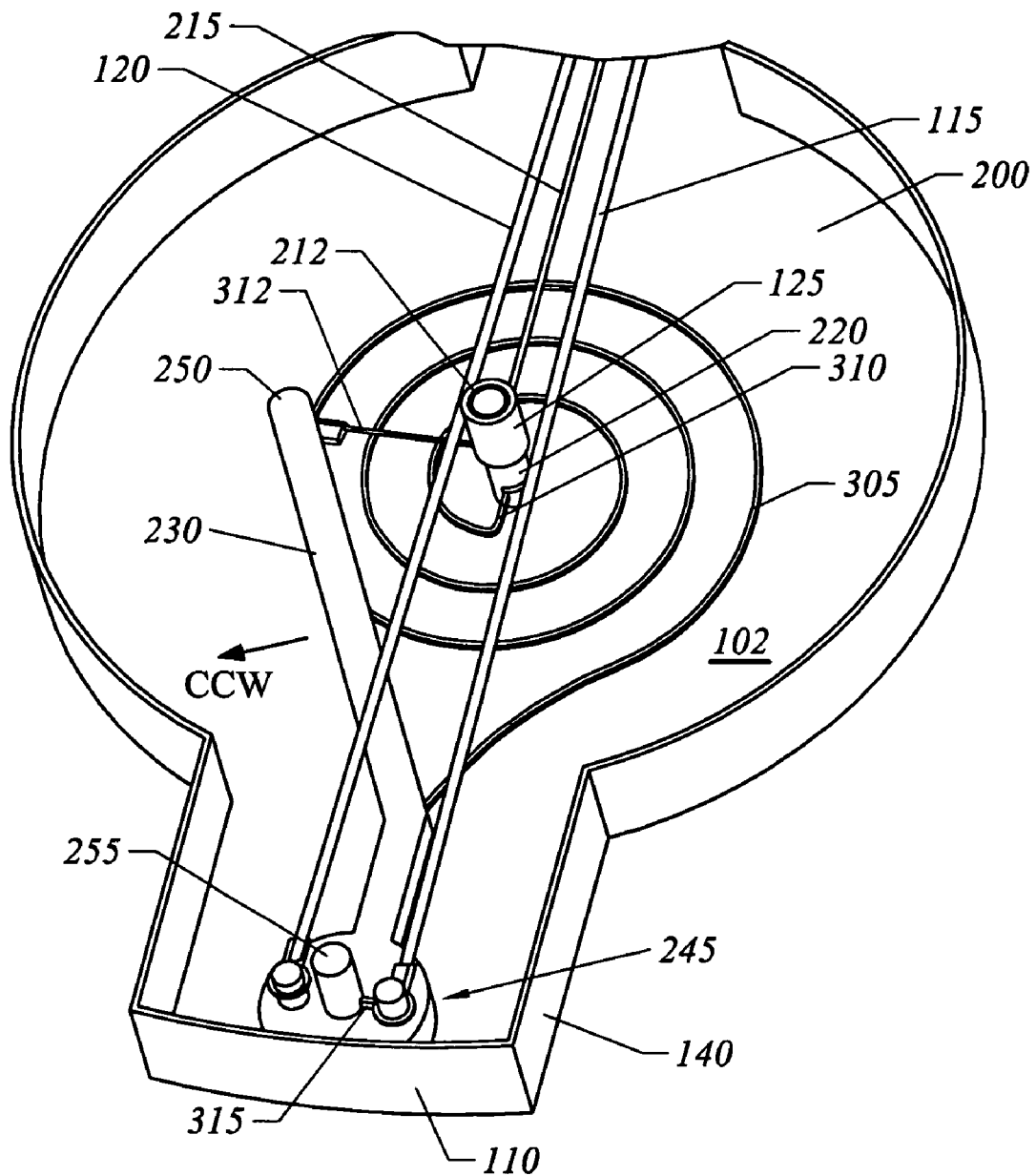
FIG. 3 is a perspective view of another integrated SMA-actuated gauge pointer in accordance with a specific embodiment of the present invention.

FIG. 3 is a perspective view of an integrated SMA-actuated gauge pointer, according to an alternate embodiment of the present invention. Actuated gauge pointer 200 of FIG. 3 is similar in configuration and operation to the integrated SMA actuator of gauge pointer 100 with the exception that epicyclic gear mechanism 180 and bias member 135 of FIG. 1A are absent. A flexible mechanical link 312 couples the pin 125 to a lever 230. Torsion spring 305 is used to store and release return energy by resiliently coupling pin 125 to proximate end 110. Flexible mechanical link 312 can be formed from any material capable of flexing without loss of dimensional stability over numerous cycles of wrapping and unwrapping around pin 125. In one embodiment of the present invention, flexible mechanical link 312 is a string. But other flexible materials, such as strips of plastic, textile, or wire formed from nylon or other flexible materials can be otherwise utilized in other embodiments.

Torsion spring 305 is also configured to provide electrical power and is electrically connected to SMA element 115 through a first pathway and a second pathway. The first pathway extends from end 310 at an outer connection 220 of pin 125 via torsion spring 305 to lever pivot 255. The first pathway then continues from lever pivot 255 to end 315, which in turn is connected to one end of first SMA element 115. The second pathway extends from attachment point 107 (not shown) via ground return wire 215 to inner connection 212 of pin 125. Both pathways provide an electrical conduction path for enabling a current to flow through an SMA element.

Figure 8:
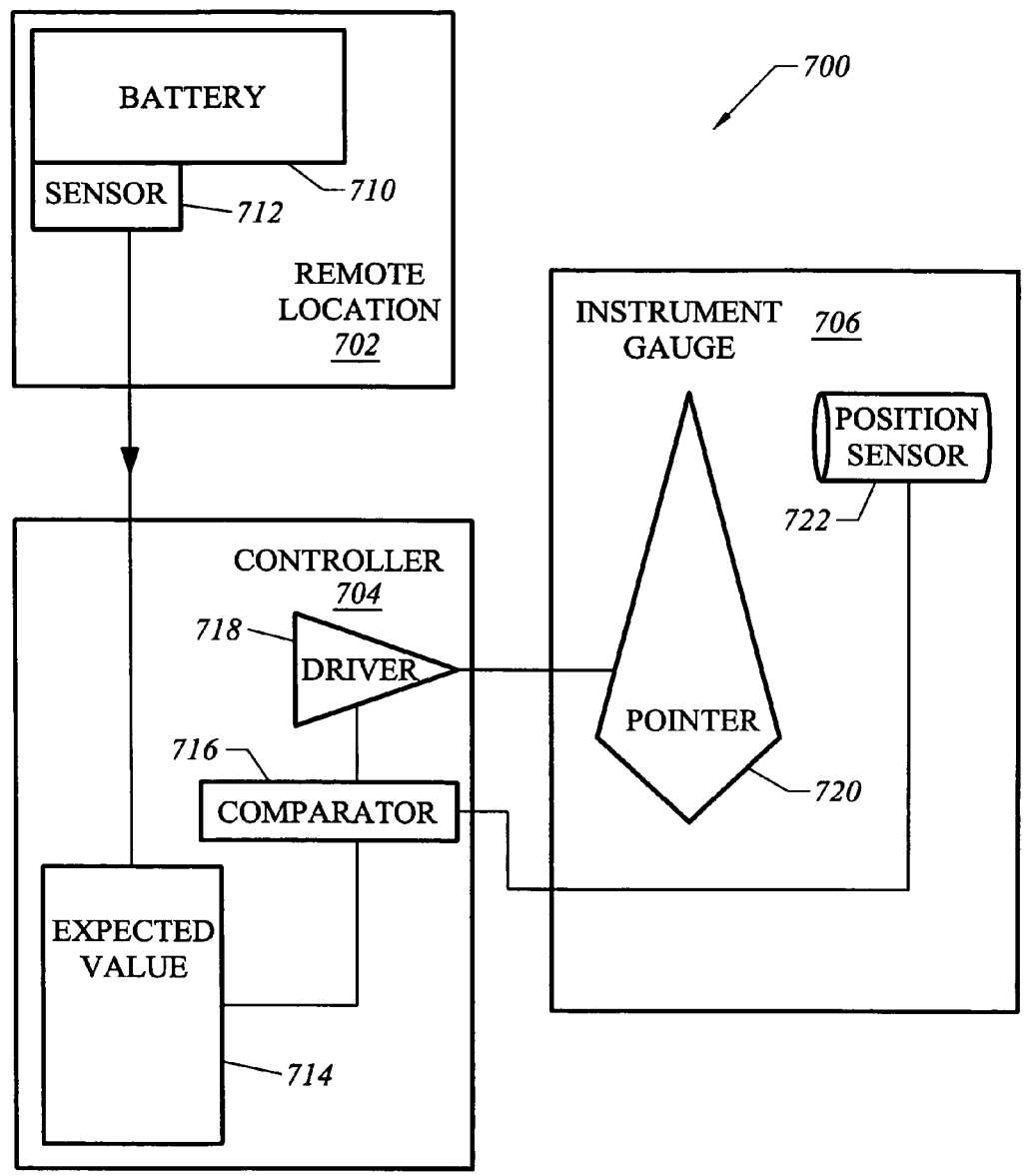
FIG. 8 is a functional block diagram of an SMA-actuated gauge pointer control system in accordance with an embodiment of the present invention.

In operation, electric current is applied to SMA element 115 using the first and second pathways typically under control of a computing device, such as a microprocessor, a microcontroller, or the like (see e.g., FIG. 8). As SMA 115 contracts, base end 245 of lever 230 rotates counterclockwise ("CCW") about lever pivot 255 in relation to housing 102, thereby moving distal end 250 of lever 230 away from pin 125. As lever 230 deflects away from pin 125, flexible mechanical link 312 partially unwraps in a clockwise direction about pin 125. As viewed from a frame of reference on or traveling with housing 102, the unwrapping of flexible mechanical link 312 causes an apparent counter-clockwise rotation of pin 125. Actually, pin 125 is fixed with respect to the instrument panel (e.g., instrument gauge 20 of FIG. 1B). As such, the actual path of distal end 250 of lever 230 is therefore in a clockwise direction at an increasing radius, as would be expected from a unwrapping string or other flexible link that has been previously wound in a counter-clockwise direction. As housing 102 rotates, torsion spring 305 tightens in a clockwise fashion about pin 125, thereby storing a return energy. Once electric current is removed from first SMA element 115, the return energy stored in torsion spring 305 is released, reversing the chain of motion described above to place gauge pointer 200 in an initial condition (i.e., position prior to activation of first SMA element 115.) The release of the return energy also causes flexible mechanical link 312 to wrap in a counter-clockwise direction around pin 125, which returns lever 230 to its initial position so as to elongate first SMA element 115.

Figure 4A:
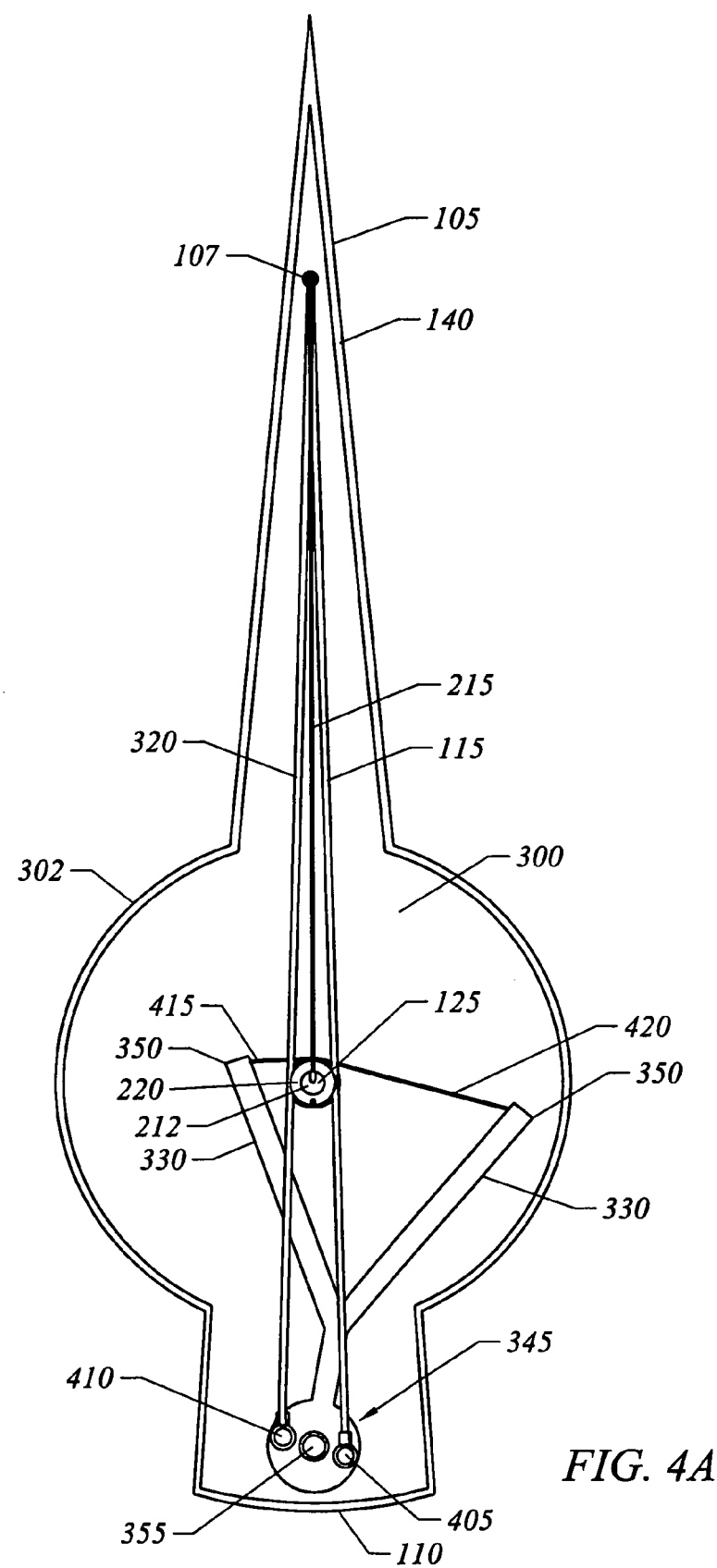
FIG. 4A is a top-down view of yet another exemplary integrated SMA-actuated gauge pointer of one embodiment of the present invention.

FIG. 4A is a top-down view of another exemplary integrated SMA-actuated gauge pointer 300, according to yet another embodiment of the present invention. Unlike previously discussed actuators, SMA-actuated gauge pointer 300 of FIG. 4A includes an active antagonistic SMA element 320 rather than a bias member, such as clip 135 of FIG. 1A or torsion spring 305 of FIG. 3. Second active SMA element 320 is provided in antagonistic relation to first SMA element 115. First SMA element 115 and second SMA element 320 are both electrically connected at a common attachment point 107 of distal end 105. Ground return 215 is also connected to attachment point 107 and to inner connection 212 of pin 125. Electrical power is provided separately to first SMA element 115 and second SMA element 320. Alternatively, electrical power may be provided through separate connections on pin 125. An exemplary configuration for providing power to SMA elements 115 and 320 of FIG. 4A is described next.

Figure 4B:
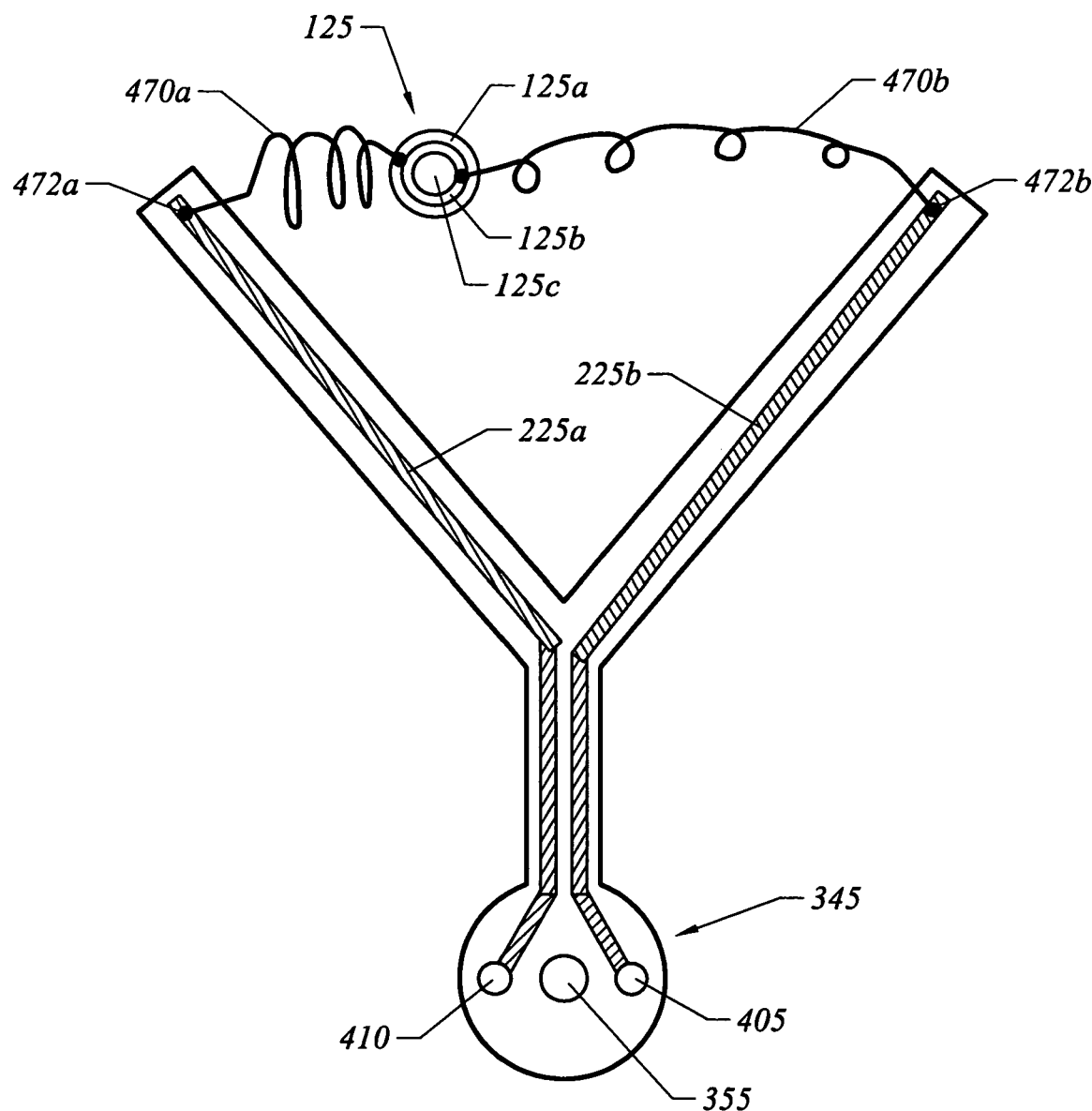
FIG. 4B illustrates one example of any number of methods for providing power to one or more SMA elements, according to an embodiment of the present invention.

FIG. 4B illustrates one example of any number of methods for providing power to one or more SMA elements, according to an embodiment of the present invention. In this instance, pin 125 is configured to include three conductors indicated symbolically as conductors 125a, 125b and 125c, where conductors 125a and 125b provide electrical power to respective SMA elements 350 and 115. The third conductor, which is conductor 125c, provides a ground connection and is coupled to ground return 215 (not shown) from SMA elements 350 and 115. Each of these conductors is electrically insulated from the others. As shown, conductor 125a is coupled via a flexible wire 470a to attachment point 472a, and similarly, conductor 125b is coupled via a flexible wire 470b to attachment point 472b. Flexible wires 470a and 470b can be insulated so as not to cause an electrical short circuit from any of the wires to another conductive surface (e.g., the SMA elements) in the gauge pointer.

Note that in other embodiments, first ends of flexible wires 470a and 470b are inserted through a feed-through (not shown) in the center of pin 125 and coupled to respective power sources (e.g., emanating from a controller, which is not shown in FIG. 4B) rather than to one of multiple conductors 125a, 125b, and 125c. Connections within gauge pointer housing 302 between pin 125 and both a first power connection 410 and a second power connection 405 may also be made by other suitable means, such as through conductive traces in gauge pointer housing 302 that extend through base 345 to first SMA element 115 and second SMA element 320, respectively (not shown). In one embodiment, first power connection 410 and second power connection 405 are respectively coupled to a first power supply and a second power supply (both not shown) to provide for independent actuation control over second SMA element 320 and first SMA element 115.

As is shown in FIG. 4B, conductive paths 225a and 225b extending from attachment points 472a and 472b, respectively. Conductive paths 225a and 225b respectively terminate at a first power connection 410 and a second power connection 405. Although not shown, one end of second SMA element 320 is connected to first power connection 410 and one end of first SMA element 115 is connected to second power connection 405. So as FIG. 4B indicates, at least two power signals can be applied to at least two SMA elements by way of conductive paths, such as conductive paths 225a and 225b, which are located within a gauge pointer of a specific embodiment of the present invention.

Referring again to FIG. 4A, gauge pointer 300 rotates when a controller (e.g., a microprocessor) provides an electric current to either first SMA element 115 or second SMA element 320 through an electrical pathway described above. First SMA element 115 actuation deflects yoke 330 in a first or counterclockwise direction with respect to gauge pointer 300, causing a first flexible mechanical link 415 to partially unwrap from the pin 125. At the same time, a second mechanical link 420 partially wraps around pin 125. This wrapping and unwrapping action is similar to that described in connection with FIG. 3, these actions causing gauge pointer housing 302 to rotate, for example, clockwise relative to pin 125. In addition, deflection of yoke 330 in first direction elongates second SMA element 320.

Similarly, activation of second SMA element 320 deflects yoke 330 in a second direction opposite first direction (i.e., clockwise) with respect to gauge pointer 300, causing second flexible mechanical link 420 to partially unwrap from pin 125, while simultaneously causing first flexible mechanical link 415 to partially wrap around pin 125. This is the case illustrated in FIG. 4A, whereby the unwrapping action of second flexible mechanical link 420 causes gauge pointer housing 302 to rotate counter-clockwise relative to pin 125. The resulting deflection of yoke 330 in the second direction causes elongation or extension of first SMA element 115. One advantageous feature of this embodiment is that gauge pointer 300 remains at the last condition upon termination or disruption of power. Gauge pointer 300 remains at its last condition because no bias member is present to store or impart a return force. As is characteristic of antagonistic SMA designs, the restoration force is provided via activation of the opposing SMA element. Here, for example, SMA element 115 is actuated (or moved) and contracts (and holds position) until it is extended through the activation of second SMA element 320. This "move-and-hold" attribute of gauge pointer 300 may be desirable for applications where a mechanical memory of an earlier condition is desired.

Figure 5:
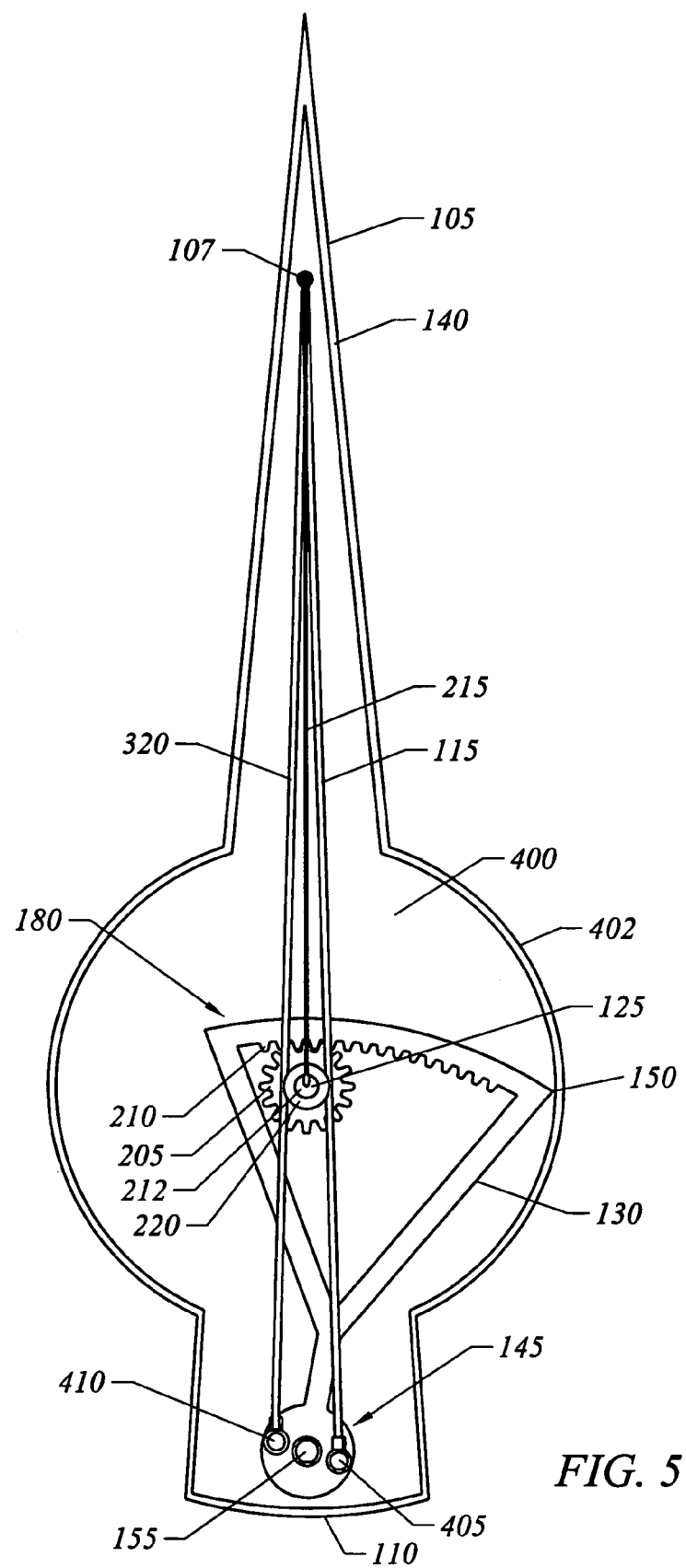
FIG. 5 is a top-down view of another exemplary integrated SMA-actuated gauge pointer of the present invention.

FIG. 5 is a top-down view of an exemplary integrated SMA-actuated gauge pointer, according an embodiment of the present invention. Gauge pointer 400 is similar to gauge pointer 100, and previously described with respect to FIGS. 1A and 2, except that bias member 135 is removed and SMA element 120 is replaced with active antagonistic SMA element 320. Gauge pointer 400 moves through the antagonistic activation of first and second SMA elements 115, 320, similar to that described above with regard to gauge indicator 300 of FIG. 4A, but includes epicyclic action as described above with regard to gauge pointer 100 (FIGS. 1A and 2). Power and ground return may be provided to first SMA element 115 and second SMA element 320 through any suitable means, such as those described in the previous embodiments. In particular, power and ground can be provided in a manner as described in FIG. 4B.

Figure 6:
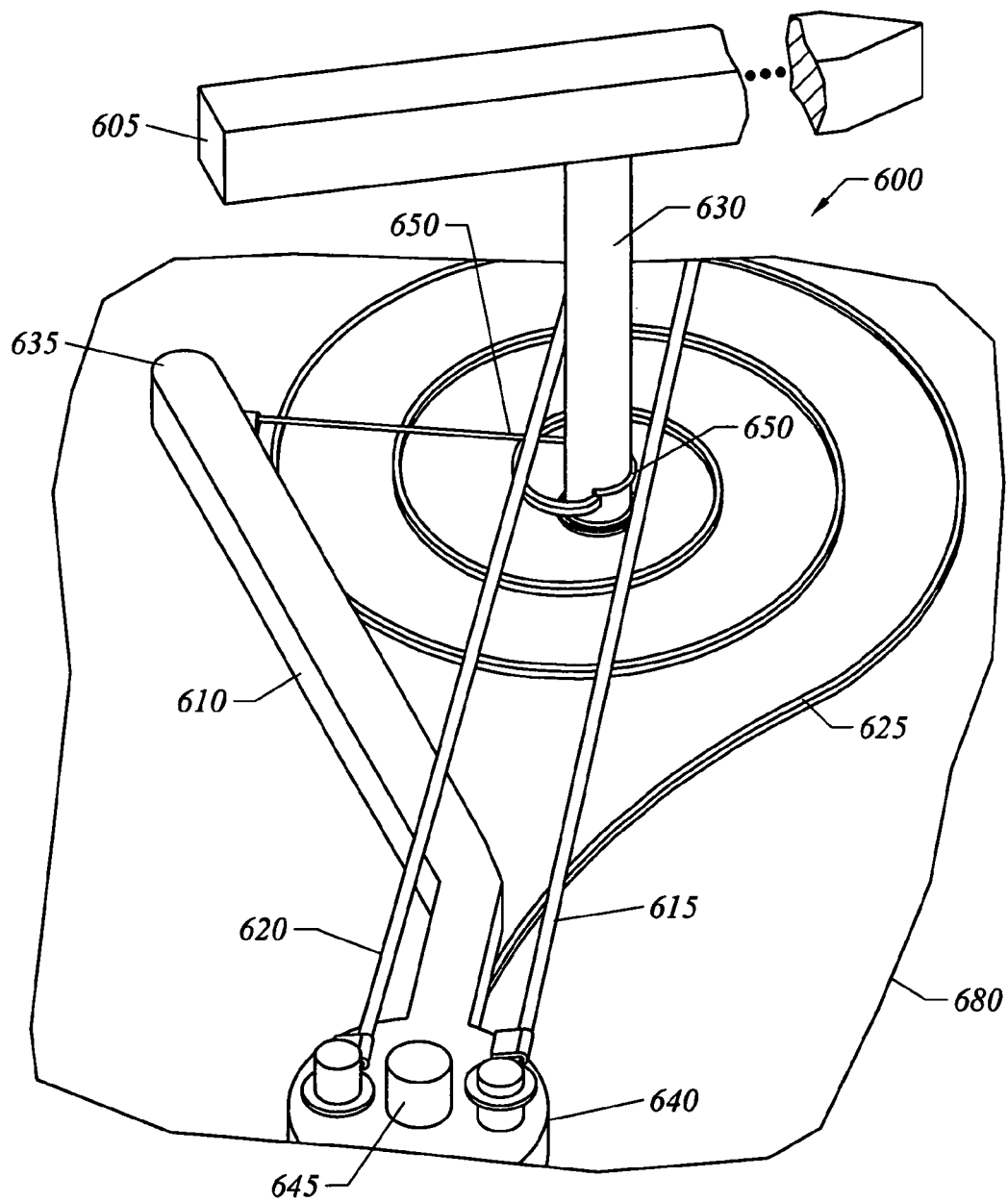
FIG. 6 is a perspective view of a gauge pointer actuated by an SMA-actuator, according to a specific embodiment of the present invention.

FIG. 6 illustrates another representative SMA-actuated gauge pointer in accordance with a specific embodiment of the present invention. SMA-actuated gauge pointer 600 operates similar to SMA-actuated gauge pointer 200 of FIG. 3. SMA-actuated gauge pointer 600 of FIG. 6 differs from gauge pointer 200 in that the compact design of the earlier embodiments is still utilized, but the elements are not necessarily limited to within the physical parameters of the gauge pointer housing. The operational mechanism of the gauge pointer 600 can be located behind another structure (not shown) such as a dash board or instrument panel.

FIG. 6 is a perspective view of a non-integrated actuated gauge pointer 600 that includes a fixed housing 680, a needle 605, a lever 610, a first SMA element 615 and a second SMA element 620, and a torsion spring 625. Fixed housing 680 can be any fixed surface, such as a dashboard in the case of an automotive application. Here, gauge pointer 600 includes a pin 630 as a shaft that is rotatably coupled to fixed housing 680. Lever 610 includes a tip end 635 and a base end 640, and is rotatably coupled to fixed housing 680 through a lever pivot 645. A torsion spring 625 is attached between fixed housing 680, for example, at lever pivot 645 and at pin 630. A flexible mechanical link 650 couples tip end 635 of lever 610 to pin 630.

In one instance, first SMA element 615 and second SMA element 620 are connected between fixed housing 680 and lever 610 in an antagonistic configuration. In this configuration, first SMA element 615 receives power and ground return through fixed housing 680, which can be supplied in a number of conventional ways, or as described above. Second SMA element 620 is used in a passive role to provide environmental temperature compensation for first SMA element 615, as discussed above with SMA element 120 of FIG. 1A.

Activation of first SMA element 615 deflects lever 610 and causes flexible mechanical link 650 to partially unwrap from pin 630. The unwrapping action causes pin 630 and needle 605 to rotate relative to fixed housing 680. When pin 630 is rotated relative to fixed housing 680, torsion spring 625 is twisted, thereby generating and storing a return energy. Once electric current is removed from first SMA element 615, the return energy stored in torsion spring 625 is released, both pin 630 and needle 605 rotate back to an initial condition. The rotation of pin 630 causes flexible mechanical link 650 to wrap around pin 630 and return lever 610 to its initial position, elongating first SMA element 615.

The degree of rotation for positioning gauge pointer to accurately reflect the condition being measured depends on a number of factors such as, for example, the size and shape of the indicator, spacing between incremental measurement units on the gauge face, and the conditions (e.g., ambient temperature) of the remote system being monitored. In the example of FIG. 1A, a monitoring system is a sensor configured to sense a battery voltage. Further, SMA element activation is controlled by a computing device, such as a microprocessor, as sensing information from various sensors located on different systems throughout a vehicle is provided to the controller. In a specific embodiment, the controller can be a dedicated microcontroller configured to execute instructions for controlling only the gauge indicator. But any control system that is already present in a vehicle (i.e., engine controller or other vehicle computer) can control SMA actuation since gauge pointers of the present invention require only relatively simple inputs and outputs with low processor capacity requirements. The SMA elements are activated when the microprocessor provides an output voltage to the electrical pathways described above in the various embodiments. The output voltage for performing actuation is therefore based on the sensed condition, such as the battery voltage of FIG. 1B. Note that analog control systems or any other type of controlling mechanism can be substituted in place of a microprocessor.

Figure 7:
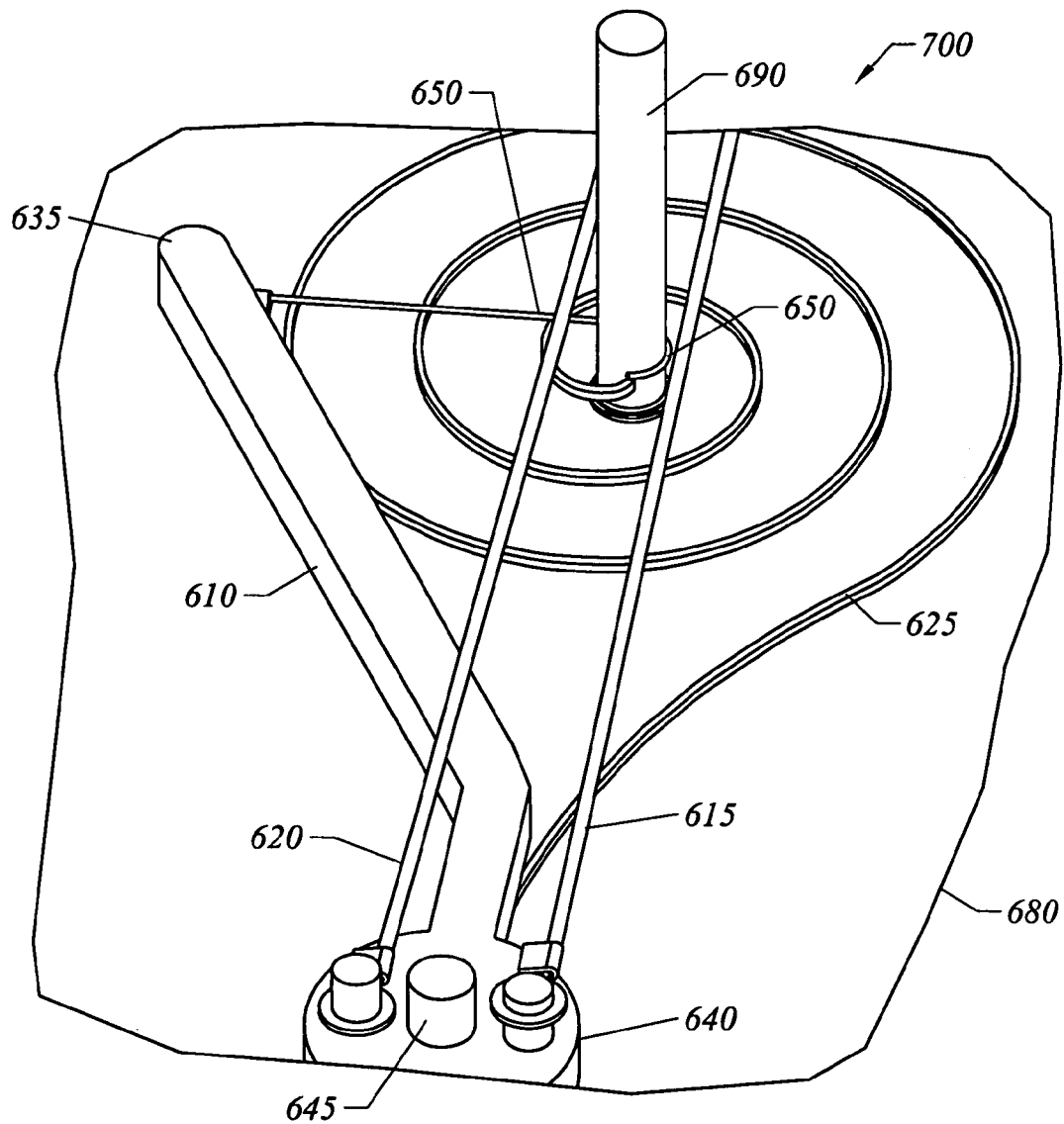
FIG. 7 depicts an exemplary SMA rotary actuator in accordance with a specific embodiment of the present invention.

FIG. 7 illustrates a general rotary actuator in accordance with an embodiment of the present invention. Although most of the discussion of the exemplary embodiments heretofore describe rotary actuators in the context of actuating gauge pointers, SMA rotary actuators of the present invention can be used in applications other than as gauge pointers.

SMA rotary actuator 700 of FIG. 7 includes similarly referenced elements as depicted in FIG. 6. But as shown in FIG. 7, a shaft 690 replaces pin 630. As such, SMA rotary actuator 700 is a stand-alone actuator. In this instance, lever pivot 645 is mounted to fixed housing 680. To rotate shaft 690 in one direction, flexible mechanical link 650 is unwrapped, whereas to rotate shaft 690 in the other direction, torsion spring 625 is unwound (thereby winding flexible mechanical link 650). Shaft 690, which is the mechanical output of SMA rotary actuator 700, can be rigidly coupled to a payload (e.g., a gauge pointer, a toothed gear, or any other member that can convert rotational motion into useful work). Further, SMA rotary actuator 700 can have power and ground (not shown) to SMA elements 615 and 620 other ways than through a center pin, as has been previously described. An ordinarily skilled artisan should recognize various ways to supply power and ground to SMA elements 615 and 620 other than through center pin 630 of FIG. 6.

Other previous embodiments of SMA-actuated gauge pointers can be modified without undue effort to implement an SMA rotary actuator, similarly described in FIG. 7. For example, SMA-actuated gauge pointer 100 of FIG. 1A can be modified to: couple yoke base end 145 to a fixed housing (or other immovable surface), replace pin 125 with a rotatable shaft (now shown in FIG. 1A), remove both housing 102 and ground return 215, and provide bias member 135 with another point (not shown) that contacts and/or anchors one end of bias member 135 to store mechanical energy received from its other end that is contact with yoke 130. For example, that another point can be coupled to the fixed housing or an immovable surface. So with these modifications, SMA-actuated gauge pointer 100 can operate as an SMA rotary actuator, according to a specific embodiment of the present invention. Similar modifications can be made with respect to any other SMA-actuated gauge pointer to form a SMA rotary actuator of the present invention.

FIG. 8 is a functional block diagram illustrating the operation of an exemplary closed-loop feedback system 700, according to one embodiment. In this example, system 700 determines the degree of rotation required to accurately indicate a condition, such as a state of battery voltage for a vehicle. In this instance, a condition sensor communicates that condition to indicate a specific angular position of the gauge pointer. As shown in FIG. 8, a remote system 702 includes a system component (e.g., a battery) requiring monitoring. In particular, battery 710 can be located under the hood of a car, with a voltage sensor 712 also residing at remote system 702 (or any other location suitable for measuring voltage). Sensor 712 operates to periodically send a voltage data signal representing the voltage of battery 710. That voltage data signal is received into controller 704, which can be a microcontroller operating in accordance with a set of computer readable instructions effectuating control of a gauge pointer.

A gauge pointer 720 according to any of the various embodiments described herein is located in an instrument gauge 706 on an automobile dashboard. Also in instrument gauge 706 is a position sensor 722, such as a photodiode configured to determine the angular position of the pointer using reflected, modulated light, as is well known. Upon sensing a position, position sensor 722 generates a position data signal representing the angular position of gauge pointer 720.

In operation, controller 704 compares the measured angular position represented by the position data signal with an expected value 714, for example, stored in a look-up table, or otherwise represented as a remote condition-indicating signal. For a discrete value of voltage measured at sensor 712, a corresponding expected position can be stored in the look-up table for reference. For example, if 12.9 volts is associated with 1200 "units of measure" stored in the look-up table, then 1200 units of measure can be compared against those units of measure associated with the position data signal. If the units of measure are the same, then no corrective action is required; the angular position of pointer 720 is conveying correct information. But if the units of measure do not match, then comparator 716 signals driver 718 to drive a power signal to an SMA element located within a perimeter of pointer 720. That is, an error-corrected power signal is applied to actuator elements of pointer 720 to correct the angular position of pointer 720. This error-corrected power signal is intended to, for example, deflect the SMA activated gauge indicator an appropriate amount to indicate the status of remote system 702, which can also include oil pressures, fuel or other liquid capacities, or engine temperatures, just to name a few other examples of automotive applications.

There are several methods known in the art for sensing angular position, so reference to particular methods below should not be construed as limiting the scope of the inventive teachings presented herein. Although these methods employ different physical principles, they each share an ability to produce a signal indicative of angular position. In one position sensing embodiment, the ring gear 210 of the epicyclic gear mechanism 180 may further be adapted to include a potentiometer configured to determine the orientation of the gauge pointer housing 100 relative to the pin 125. The orientation of the gauge pointer housing 100 may be calculated from the location along the ring gear 210 that the ring gear 210 meshes with the planet gear 205. The location where the gears mesh may be determined by using the resistivity generated at that location by the potentiometer.

Other sensing techniques may also be utilized within the above described embodiments. Sensing method examples include:

(a) Optical sensing. A surface with reflectivity varying in an azimuthal direction is coupled concentrically to gauge pointer housing 100. Also, at least one fixed light emitting diode ("LED") is positioned to send a beam toward the reflective surface and receive the modulated reflected beam. Then, the modulations can be counted by a digital pulse counter to determine angular position of the gauge pointer.

(b) Capacitive sensing. A variable capacitor is formed from electrodes moving with the gauge pointer and electrodes fixed on the dashboard. A timing circuit measures a RC time constant of a circuit dominated by the variable capacitance and a fixed calibrated resistance. So, the resulting time constant indicates the position of the moving electrodes, and thus the pointer.

(c) Resistive sensing. A resistive strip is formed in fixed position on the dashboard, and a wiping contact is coupled to the rotating gauge pointer housing 100 to complete a circuit. A variable resistance (or voltage drop across the variable resistance) can be measured to determine the angular position of the gauge pointer.

Other positions for the above sensing elements and other sensing principles may also be employed without departing from the essential teachings of the present invention.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

What is claimed:

1. A shape memory alloy actuated indicator movably attached to a base, comprising:
    an indicator having a housing surrounded by a perimeter, the housing being movably attachable to the base; and
    a shape memory alloy element being no larger than the perimeter of said housing, said shape memory alloy element being attached to said housing within said perimeter,
    wherein activation of said shape memory alloy element causes movement of said housing of said indicator relative to the base.

2. The shape memory alloy actuated indicator of claim 1, further comprising a second shape memory alloy element disposed within said perimeter of said indicator housing configured in an antagonistic arrangement to said shape memory alloy element.

3. The shape memory alloy actuated indicator of claim 1, further comprising a pin coupled to said indicator housing configured to provide a current to said shape memory alloy element.

4. The shape memory alloy actuated indicator of claim 1, further comprising an epicyclic gear mechanism disposed within said perimeter of said indicator housing and coupled to said shape memory alloy element such that activation of said shape memory alloy element moves said epicyclic gear mechanism which in turn moves said indicator.

5. The shape memory alloy actuated indicator of claim 1, further comprising a lever disposed within said perimeter of said housing and coupled to said housing, said shape memory alloy element coupled to said lever so that activation of said shape memory alloy element moves said lever and said housing.

6. The shape memory alloy actuated indicator of claim 5, wherein said lever is disposed entirely within said perimeter of said housing.

7. The shape memory alloy actuated indicator of claim 1, further comprising a bias member disposed within said perimeter of said housing such that when said shape memory alloy element is deactivated said bias member extends said shape memory alloy element and moves said housing to an initial condition.

8. The shape memory alloy actuated indicator of claim 7, wherein said bias member is disposed entirely within said perimeter of said housing.

9. A shape memory alloy actuated gauge pointer movably attachable to a base, comprising:
    a gauge pointer housing having a perimeter; and
    first and second shape memory alloy elements disposed within said perimeter of said gauge pointer housing and configured such that activation of said first shape memory alloy element causes movement of said gauge pointer housing relative to the base in a first direction, and activation of said second shape memory alloy element causes movement of said gauge pointer housing relative to the base in a second direction.

10. The actuated gauge pointer of claim 9, wherein said direction is opposite said first direction.

11. The actuated gauge pointer of claim 9, further comprising a pin coupled to said gauge pointer housing configured to provide current to each of said first and second shape memory alloy elements.

12. The actuated gauge pointer of claim 9, further comprising a epicyclic gear mechanism disposed within said perimeter of said gauge pointer housing and coupled to said first and second shape memory alloy elements such that activation of either said first or second shape memory alloy element moves said epicyclic gear mechanism which in turn moves said gauge pointer housing.

13. The actuated gauge pointer of claim 9, further comprising:
a lever disposed within said perimeter of said gauge pointer housing and coupled to said gauge pointer housing; and
said first and second shape memory alloy elements each coupled to said lever and said gauge pointer housing such that activation of either said first or second shape memory alloy elements moves said lever which in turn moves said gauge pointer housing.

14. The actuated gauge pointer of claim 13, wherein said lever is disposed entirely within said perimeter of said gauge pointer housing.

15. An actuated gauge pointer, comprising:
a fixed housing;
a gauge pointer coupled to said fixed housing via a pin;
a lever pivotably coupled to said fixed housing at a pivot point spaced from said pin and coupled to said gauge pointer; and
a shape memory alloy element coupled to said fixed housing and said lever configured such that activation of said shape memory alloy element causes movement of said lever relative to the fixed housing, thereby rotating the pin and the gauge pointer.

16. The actuated gauge pointer of claim 15, further comprising a second shape memory alloy element coupled to said fixed housing configured in an antagonistic arrangement to said shape memory alloy element.

17. The actuated gauge pointer of claim 15, further comprising a bias member coupled to said fixed housing such that when said shape memory alloy element is deactivated said bias member extends said shape memory alloy element and moves said gauge pointer to an initial condition.

18. A system for controlling a position of a gauge indicator movably attachable to a base, comprising:
a gauge indicator having a perimeter and being movably attachable to the base;
a shape memory alloy element disposed entirely within said gauge indicator perimeter and configured in that shape memory element activation results in gauge indicator movement relative to the base;
a position sensor that indicates said position information of said gauge indicator after shape memory alloy actuation; and
a condition responsive device adapted to control the activation of said shape memory alloy element in response to said position information provided by said position sensor and in accordance with a remote condition-indicating signal.

19. The system for controlling said position of a gauge indicator according to claim 18 wherein said position sensor is one of a resistive position sensor, a capacitive position sensor and an optical position sensor.

20. A method for positioning a gauge indicator, comprising:
applying a power signal within a housing of a gauge indicator;
actuating a shape memory alloy ("SMA") element disposed entirely within said gauge indicator perimeter in response to said power signal; and
rotating a lever-type member,
wherein the rotating of said lever-type member causes a pin to rotate, thereby causing said housing to rotate.

21. The method for controlling said position of a gauge indicator according to of claim 20 further comprising:
sensing a position of said gauge pointer;
generating a position signal including information indicating the position of said gauge indicator; and
modifying said power signal if said information indicates said position differs from an expected position.

22. A shape memory alloy rotary actuator comprising:
a first anchor point, a second anchor point and a lever pivot point;
a rotatable shaft configured to rotate about an axis spaced from said lever point;
a flexible mechanical link having one end coupled to said rotatable shaft;
a lever having a first end coupled to said lever pivot point and a second end coupled to another end of said flexible mechanical link, said lever configured to rotate about said lever pivot point; and
a shape memory alloy element having a first end and a second end coupled to said first anchor point and said second anchor point, respectively, said second anchor point being disposed on said lever.
wherein the activation of said shape memory alloy element causes rotation of said rotatable shaft.

23. The shape memory alloy rotary actuator of claim 22, wherein said flexible mechanical link is tangentially coupled to said rotatable shaft by being wrapped around a portion of said rotatable shaft.

24. The shape memory alloy rotary actuator of claim 22, further comprising a second shape memory alloy element having a first end and a second end coupled to said first anchor point and a third anchor point disposed on said lever, respectively, wherein said second shape memory alloy is configured in an antagonistic arrangement to said shape memory alloy element.

25. The shape memory alloy rotary actuator of claim 22, further comprising a bias member having a first end attached to a third anchor point disposed on said lever and a second end configured to move said rotatable shaft to an initial condition when said shape memory alloy element is deactivated, said bias member thereby extending said shape memory alloy element.

26. A shape memory alloy rotary actuator, comprising:
a first anchor point, a second anchor point and a pivot point;
a planet gear;
a rotatable shaft disposed within said planet gear and coupled to said planet gear so both rotate about an axis simultaneously, said axis spaced from the pivot point;
a ring gear;
a member having a first portion including said ring gear configured to enmesh with said planet gear and a second portion coupled to said pivot point, said member configured to rotate about said pivot point; and a shape memory alloy element having a first end and a second end coupled to said first anchor point and said second anchor point, respectively, said second anchor point being disposed on said member, wherein the activation of said shape memory alloy element causes rotation of said rotatable shaft.

27. The shape memory alloy rotary actuator of claim 26, further comprising a second shape memory alloy element having a first end and a second end coupled to said first anchor point and a third anchor point disposed on said member, respectively, wherein said second shape memory alloy is configured in an antagonistic arrangement to said shape memory alloy element.

28. The shape memory alloy rotary actuator of claim 26, wherein said member, said ring gear and said planet gear form an epicyclic gear mechanism coupled to said shape memory alloy element such that activation of said shape memory alloy element moves said epicyclic gear mechanism which in turn rotates said rotatable shaft.

29. A shape memory alloy rotary actuator, comprising:
a first anchor point, a second anchor point and a pivot point;
a first flexible mechanical link and a second flexible mechanical link;
a rotatable shaft rotatable around an axis spaced from said pivot point and coupled tangentially to a first end of said first flexible mechanical link to rotate said rotatable shaft in a first direction of rotation and coupled tangentially to a first end of said second flexible mechanical link to rotate said rotatable shaft in a second direction of rotation;
a member having a first portion coupled to a second end of said first flexible mechanical link, a second portion coupled to a second end of said second flexible mechanical link, and a third portion coupled to said pivot point, said member configured to rotate about said pivot point; and
a shape memory alloy element having a first end and a second end coupled to said first anchor point and said second anchor point, respectively, said second anchor point being disposed on said member,
wherein the activation of said shape memory alloy element causes rotation of said rotatable shaft.

30. The shape memory rotary actuator of claim 29, further comprising a second shape memory alloy element having a first end and a second end coupled to said first anchor point and a third anchor point disposed on said member, respectively, wherein said second shape memory alloy is configured in an antagonistic arrangement to said shape memory alloy element.

* * * * *

UNITED STATES PATENT AND TRADEMARK OFFICE
CERTIFICATE OF CORRECTION

| | |
|---|---|
| PATENT NO. | : 7,082,890 B2 |
| APPLICATION NO. | : 10/838644 |
| DATED | : August 1, 2006 |
| INVENTOR(S) | : Roderick MacGregor and Andrei Szilagyi |

It is certified that error appears in the above-identified patent and that said Letters Patent is hereby corrected as shown below:

Column 14, Line 14 (Claim 21), "according to of claim 20" should read -- according to claim 20 --

Signed and Sealed this

Seventh Day of November, 2006

JON W. DUDAS
*Director of the United States Patent and Trademark Office*